Sept. 27, 1966 K. SIEBERTZ 3,274,667

METHOD OF PERMANENTLY CONTACTING AN ELECTRONIC SEMICONDUCTOR

Filed Sept. 17, 1962

United States Patent Office 3,274,667
Patented Sept. 27, 1966

3,274,667

METHOD OF PERMANENTLY CONTACTING AN ELECTRONIC SEMICONDUCTOR

Karl Siebertz, Munich-Obermenzing, Germany, assignor to Siemens & Halske Aktiengesellschaft, Berlin, Germany, a corporation of Germany Filed Sept. 17, 1962, Ser. No. 223,976
Claims priority, application Germany, Sept. 19, 1961, S 75,819
1 Claim. (Cl. 29—155.5)

My invention relates to a method of contacting a semiconductor assembly by pressing a terminal or other connecting member at elevated temperature against the locality to be contacted, thus permanently joining the member with the semiconductor.

Conventionally used for this method, known as thermocompression, is a very thin connecting wire of gold, aluminum, silver or similarly good-conducting and preferably soft metal The wire is pressed at elevated temperature against the locality to be contacted by means of a knife edge on a punch. In this manner, the thin wire is firmly attached to a semiconductor crystal or to the electrode on such a crystal. Due to the heat applied, the pressure required for such joining operation is considerably reduced in comparison with that needed for cold welding. This is of advantage particularly on account of the brittleness of the crystalline semiconductor material.

The wires used for this contacting method, having in most cases a very small diameter of less than 10 microns, have but a slight current-carrying ability, a high inductivity and a slight mechanical stability.

It is an object of my invention to eliminate these disadvantages of the known semiconductor contacting method and to provide a possibility of joining the rather sensitive semiconductors or semiconductor-electrode assemblies with contact members of sufficiently large dimension to secure a much higher current rating together with a lower inductivity and a much greater mechanical strength.

To this end, and in accordance with a feature of my invention, a connecting member of strip-like design is pressed against the semiconductor locality to be contacted by means of a punch or the like pressure tool which is blunt or flat at the strip-engaging end, while the strip member is subjected to elevated temperature thereby joining the connecting strip member with the semiconductor. The temperature preferably applied in this method is about 200 to about 400° C., and the area pressure is between the approximate limits of 5 and 15 kg. per mm.$^2$.

The connecting member employed in the method according to the invention is a metal strip of a few microns thickness which is pressed against the semiconductor locality to be contacted by means of a relatively broad-area punch face at one or more localities, the punch having its active end designed for example as a blunt tip, or a plurality of such punches are used for simultaneously pressing the strip member at the elevated temperature against a respective plurality of places to be contacted. This causes a localized plastic deformation of the connecting strip.

According to one of the more specific features of the invention, the joining operation by thermocompression is performed in the above-described manner at a temperature below the melting temperature of the material at the locality to be contacted and also below the melting point of the contacting strip member so that no liquid phase occurs during the joining operation.

According to a modified method of the invention, however, the metal strip or tape to serve as connecting member is prepared to provide doping substances. For example, the strip member is provided with a coating of doping substance or is formed of doping substance. In these cases, the strip member is pressed against the locality to be contacted while applying an elevated temperature at which the doping substance diffuses and/or alloys into the semiconductor body to be contacted by the metal strip, thereby forming a barrier (p-n) junction or a barrier-free (ohmic) contact. This temperature may have to be higher than the range stated above. For example, when thus doping a silicon crystal with aluminum a temperature up to about 600° C. is applicable at a pressure between 5 and 15 kg./mm.$^2$.

The invention will be further described with reference to the embodiments illustrated by way of example on the accompanying drawing, in which.

Figure 1:
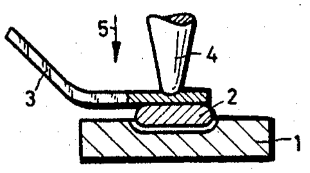
FIG. 1 is a partly cross-sectional view of a semiconductor assembly during contacting operation.

Shown in FIG. 1 is a monocrystalline semiconductor body 1 consisting, for example, of silicon or germanium, which is provided with an electrode 2 consisting of doping metal. Placed upon the electrode 2 is a thin strip member 3 of gold, although another good conducting and preferably soft metal may also be used. While heating the entire assembly to an elevated temperature below the melting point of the electrode material, the strip member 3 is pressed in the direction of the arrow 5 against the semiconductor body 1 by means of a punch 4 which has a blunt tip at its active end. A pressure of about 10 kg./mm.$^2$ is suitable at a temperature of about 300° C. This pressure is so low that no mechanical change and no change in crystalline structure of the semiconductor body takes place. For producing the desired temperature, the semiconductor body 1 or the punch 4 or both are heated during the contacting operation.

Figure 2:
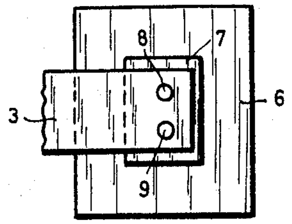
FIG. 2 is a plan view of a somewhat modified semiconductor assembly.

According to FIG. 2, a semiconductor body 6 consisting of germanium or silicon is provided with large-area electrode 7. The metal strip 3 of gold possesses two compression localities 8 and 9 produced in the manner described above with reference to FIG. 1. Such a design constitutes a particularly favorable electrode connection in electrical as well as thermal respects.

Figure 3:
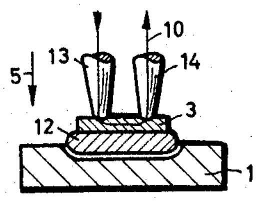
FIGS. 3, 4 and 5 are respective cross-sectional views of semiconductor assemblies during manufacturing operations according to the invention.

According to the embodiment shown in FIG. 3, two punches 13 and 14 with blunt, broad-area tips are simultaneously pressed in the direction of the arrow 5 against the flat connecting member 3 toward the electrode 12 and the semiconductor body 1. When employing two more such adjacent punches for double or multiple compression, it is particularly favorable, according to another feature of my invention, to provide for the necessary increase in temperature by passing electric current through the punches. Thus, in the embodiment of FIG. 3, electric current is passed in the direction of the arrow 10 through both punches 13, 14 and the intermediate portion of the metal tape 3, so that the electric current heats the contacting area to the elevated temperature required for thermocompression. By virtue of this improved modification of the method according to the invention, a good localization of the thermocompression temperature is secured because, due to the contact resistance at the places of engagement between connecting member 3 and punches 13 and 14, the generation of heat at these localities is particularly intensive.

According to another improvement afforded by the invention, the temperature at the contacting location is measured with the aid of a thermocouple constituted during joining operation by two adjacent punches of respectively different materials.

Figure 4:
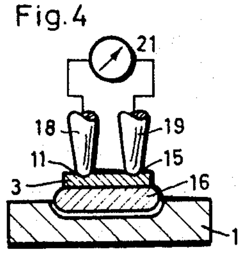

This can be done for example with the aid of the modified method represented in FIG. 4. Attached to a crystalline semiconductor body 1 is an electrode 16 to be contacted with a metal tape or strip 3 consisting of gold. Used for this purpose are two blunt-tipped pressure punches 18 and 19 which consist of respectively different materials. For example, one punch consists of copper and the other of an alloy available under the trade name Konstantan, or one punch consists, at least at the tip, of copper and the other of gold. The two punches are placed against the metal tape 17 and are electrically connected with each other by a measuring instrument 21, preferably through an interposed amplifier (not shown). The measuring instrument then indicates a thermoelectric current magnitude whose value changes in dependence upon the heating of the localities to be joined with each other. The measured current therefore is indicative of the temperature at the localities 11 and 15 to be contacted.

Figure 5:
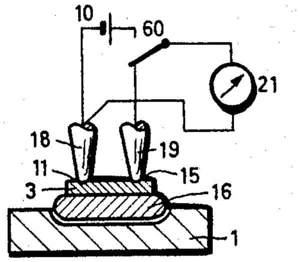

If the elevated temperature is provided by means of an electric current as described above, the heating of the contacting places 11 and 15 can be effected for example by means of a voltage pulse as represented in FIG. 5. This pulse is produced by closing for a short interval of time a switch 60 which connects a battery 10 or other current source across the pressure punches 18 and 19. By alternately switching the two punches into connection with the above mentioned measuring instrument 21, the thermoelectric current, indicating the temperature at the contacting places 11 and 15, can then be measured.

Figure 6:
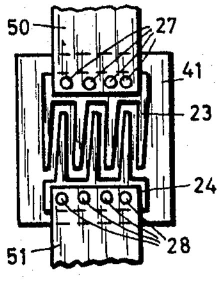
FIG. 6 is a plan view of another semiconductor device made according to the invention.

FIG. 6 shows a semiconductor body 41 of germanium or silicon which is provided with two electrodes 23 and 25 of comb shape straddling each other. The two electrodes constitute the emitter and base electrodes respectively of a transistor for very high frequencies and high power. For such circuit components it is preferable according to another feature of our invention, to apply a seam-contacting method which takes care of the relatively large dimensions of the electrodes. That is, the tape members 50 and 51 to be joined with the respective electrodes 23 and 24 are each provided with a plurality, for example four, serially arranged compression localities 27 and 28. The connecting seam is produced with the aid of a corresponding plurality of blunt, large-area punches as described above.

Figure 7:
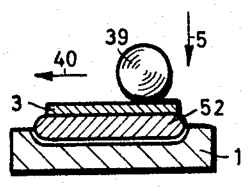
FIGS. 7 and 8 show respective cross-sectional views of two further semiconductor devices during joining operation.

The contacting according to the invention can also be performed in such a manner that the individual points of the seam overlap each other. Thus, as exemplified in FIG. 7, the permanent contacting can be effected by means of a roller 39 which is forced at elevated temperature against the metal strip 3 in the direction of the arrow 5 and which is simultaneously rolled over the metal strip in the direction of the arrow 40. The roller 39 is preferably given a disc-shaped design, having only small dimensions in the direction perpendicular to the plane of illustration.

Figure 8:
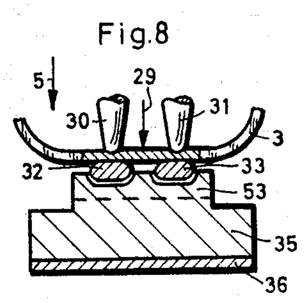

FIG. 8 shows a mesa transistor comprising crystalline semiconductor body 35 having one flat side covered by a collector electrode 36. The mesa portion 53 of the semiconductor body forms a diffused base layer 53 with which a base electrode 33 is joined by a barrier-free (ohmic) junction and with which an emitter electrode 32 is joined to form a p-n junction. The emitter electrode 32 and the base electrode 33 are permanently contacted by a metal tape 3 consisting preferably of gold. The connection with the tape is produced by pressing two blunt-tipped punches 30 and 31 in the direction of the arrow 5 against the electrodes at elevated temperature. Thereafter the metal tape 3 is cut into two terminal strips at the location denoted by an arrow 29.

As mentioned above, the contacting method according to the invention also affords simultaneously doping the semiconductor material by substance diffusing or alloying from the terminal or other connecting member into that material under the contact-forming conditions. For example, when a strip-shaped member of aluminum is pressed against a semiconductor body of silicon in accordance with the above-described method of the invention at a temperature of about 590° C. and a pressure of about 10 kg./mm.$^2$, aluminum migrates into an adjacent region of the silicon body, if the silicon has n-type conductance, a p-n junction is thus formed by the doping action. With p-type silicon, however, a barrier-free (ohmic) junction is produced in this manner.

To those skilled in the art it will be obvious, upon a study of this disclosure, that my invention permits of a variety of other modifications and hence can be given embodiments other than particularly illustrated and described herein, without departing from the essential features of my invention and within the scope of the claim annexed hereto.

I claim:

The method of contacting an electrode of an electronic semiconductor assembly which comprises placing a strip member of contact material having a width substantially equal to a face dimension of the electrode in substantially full face-to-face relation against the electrode of the semiconductor assembly to be contacted, pressing at least two mutually insulated punches of thermoelectrically different respective materials against the strip member in the direction toward the electrode of the semiconductor assembly, simultaneously passing electric current through said punches and thus through the strip-member portion intermediate the pressure locations to thereby electrically heat said locations to an elevated temperature for permanently attaching said member, and measuring the thermoelectric voltage generated between said two punches as a measure of said temperature.

References Cited by the Examiner

UNITED STATES PATENTS

| | | | |
|---|---|---|---|
| 1,938,499 | 12/1933 | Ragsdale | 219—109 |
| 2,372,211 | 3/1945 | Leathers | 219—110 |
| 2,796,510 | 6/1957 | Herbert | 219—107 X |
| 2,946,119 | 7/1960 | Jones et al. | 29—497.5 X |
| 2,996,800 | 8/1961 | Holly | 29—494 |
| 3,006,067 | 10/1961 | Anderson et al. | 29—504 X |
| 3,061,923 | 11/1962 | Kapp et al. | 29—497.5 X |
| 3,068,412 | 12/1962 | La France | 29—502 X |
| 3,091,849 | 6/1963 | Cohen | 29—504 X |
| 3,109,225 | 11/1963 | Wright et al. | 29—504 X |
| 3,115,697 | 12/1963 | Shaver et al. | 29—504 X |
| 3,125,803 | 3/1964 | Rich | 29—497.5 X |

FOREIGN PATENTS

| | | |
|---|---|---|
| 846,155 | 8/1960 | Great Britain. |
| 846,559 | 8/1960 | Great Britain. |

JOHN F. CAMPBELL, *Primary Examiner.*